(12) United States Patent
Buchenrieder et al.

(10) Patent No.: US 6,418,399 B2
(45) Date of Patent: Jul. 9, 2002

(54) METHOD FOR EXECUTING INDIVIDUAL ALGORITHMS USING A RECONFIGURABLE CIRCUIT, AND APPARATUS FOR CARRYING OUT THE METHOD

(75) Inventors: Klaus Buchenrieder, Riemerling; Rainer Kress, Pöring, both of (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/822,020

(22) Filed: Mar. 30, 2001

Related U.S. Application Data

(63) Continuation of application No. PCT/DE99/02936, filed on Sep. 15, 1999.

(30) Foreign Application Priority Data

Sep. 30, 1998 (DE) .......................................... 198 44 969

(51) Int. Cl.[7] .............................................. G06F 15/00
(52) U.S. Cl. ....................... 702/183; 702/182; 712/223; 706/13
(58) Field of Search ................................. 702/181, 182, 702/183; 712/221, 223; 710/8, 10, 104; 706/12, 13; 370/254–255

(56) References Cited

U.S. PATENT DOCUMENTS

| 4,696,001 A | * | 9/1987 | Gagliardi et al. ............ 370/224 |
| 5,794,062 A | * | 8/1998 | Baxter ......................... 710/317 |
| 5,970,487 A | * | 10/1999 | Shackleford et al. .......... 706/13 |
| 6,058,469 A | * | 5/2000 | Baxter ......................... 712/229 |

* cited by examiner

*Primary Examiner*—Bryan Bui
(74) *Attorney, Agent, or Firm*—Herbert L. Lerner; Laurence A. Greenberg; Werner H. Stemer

(57) ABSTRACT

At least two algorithms are assigned to at least one defined algorithm. Each of these two algorithms has a different probability of being the next algorithm to be executed during and/or after execution of the defined algorithm. Of the two assigned algorithms, the one which is in fact executed next is the one with the greater probability of execution.

15 Claims, 1 Drawing Sheet

METHOD FOR EXECUTING INDIVIDUAL ALGORITHMS USING A RECONFIGURABLE CIRCUIT, AND APPARATUS FOR CARRYING OUT THE METHOD

CROSS-REFERENCE TO RELATED APPLICATION

This is a continuation of copending International Application PCT/DE99/02936, filed Sep. 15, 1999, which designated the United States.

BACKGROUND OF THE INVENTION

Field of the Invention

The invention relates to a method for executing individual algorithms using a reconfigurable circuit, and to an apparatus for carrying out such a method.

The size and hence resources of reconfigurable circuits are limited. Often, the resources of such a circuit are not sufficient to execute two or more algorithms at the same time or one individual, relatively large algorithm.

A relatively large algorithm, which requires more resources than are available in the reconfigurable circuit and which needs to be executed using this circuit alone, is generally broken down into a plurality of subalgorithms, each of which itself represents a respective algorithm in turn and is chosen such that the circuit has sufficient resources for executing this subalgorithm.

These subalgorithms are executed in the circuit successively in time such that each of these subalgorithms is executed using the circuit which is configured for this subalgorithm and that, after execution of one subalgorithm, a succeeding subalgorithm is executed, the circuit being reconfigured for this succeeding subalgorithm after execution of this one subalgorithm, in so far as this succeeding subalgorithm is different from this one subalgorithm.

Data-dependent branch operations mean that it is not until at the time of execution, i.e. during the actual execution or processing of the larger algorithm, that it is known which of these subalgorithms of the larger algorithm is actually needed. At the compile time, i.e. before the time of execution, there is no indication available of which subalgorithms and hence configurations of the circuit are actually needed.

One way of still executing the larger algorithm using the reconfigurable circuit which has too few resources for this purpose is to configure this circuit individually for all subalgorithms of the larger algorithm in succession, for example on the basis of a prescribed program flow. In this context, only the configured subalgorithms which are needed are executed. If a subalgorithm is not needed, the configuration for this subalgorithm is erased without executing this subalgorithm.

Configuring the circuit during the time of execution for an unneeded part of the larger algorithm costs valuable execution time. A method is therefore required which recognizes and loads the necessary configurations in good time during execution.

M. Vasilko and Djamel Ait-Boudaoud: "Architectural Synthesis Techniques for Dynamically Reconfigurable Logic" in Reiner W. Hartenstein, Manfred Glesner (Eds.): "Field-Programmable Logic, Smart Applications, New Paradigms and Compilers", 6th Int'l Workshop on Field-Programmable Logic and Applications, FPL '96, Darmstadt, Germany, Sep. 23–25, 1996, Proceedings, Springer-Verlag, pp. 290–296 discloses the practice of calculating for the compile time the order on the basis of which the individual subalgorithms of a larger algorithm are configured in a circuit. In this case, a reconfiguration controller is obtained in which the sequence on the basis of which the subalgorithms are configured is fixed. In this case, the result of a branch operation is required in order to determine the correct subalgorithm which is to be configured.

SUMMARY OF THE INVENTION

The object of the present invention is to provide a method of processing individual algorithms with a reconfigurable circuit and an apparatus for carrying out the method which overcome the above-noted deficiencies and disadvantages of the prior art devices and methods of this general kind, and which further enable shortening the execution time in a method for executing individual algorithms using the reconfigurable circuit which has sufficient resources for executing each individual algorithm, and in which the algorithms which are to be executed are configured and executed in the circuit successively in time.

With the above and other objects in view there is provided, in accordance with the invention, a method of executing individual algorithms, which comprises:

providing a reconfigurable circuit with sufficient resources for executing each individual algorithm of a plurality of algorithms, and executing a plurality of algorithms in the circuit successively in time; and during execution of a given algorithm, reconfiguring the circuit for a following algorithm so far as the following algorithm is different from the given algorithm currently being executed.

On the basis of this solution, each algorithm is executed using the circuit which is configured for this algorithm, and, during execution of one algorithm, a succeeding algorithm is executed, the circuit being reconfigured for this succeeding algorithm during actual execution of this one algorithm, at least in so far as this succeeding algorithm is different from this one algorithm.

On this basis, the following algorithm is advantageously configured in the circuit during the actual time of execution of an algorithm and may, under some circumstances, start to operate during the actual time of execution of the one algorithm. However, a prerequisite for this is a circuit which can be dynamically configured in such a manner. Suitable circuits for this are particular products from the company Xilinx, e.g. the chip XC62xx, which already afford the basic opportunities for such dynamic configuration. The chips can be configured in the same way as writing to a memory. A configuration memory cell is addressed and then has information written to it. Accordingly, the chip can be configured during the time of execution.

With the above and other objects in view there is also provided, in accordance with an alternative mode, a method of executing individual algorithms, which comprises:

providing a reconfigurable circuit with sufficient resources for executing each individual algorithm of a plurality of algorithms, and executing a plurality of algorithms in the circuit successively in time;

reconfiguring the circuit for a following algorithm during and/or after execution of a given algorithm, at least in so far as the following algorithm to be executed is different from the given algorithm; and if a variety algorithms may need to be executed after execution of the given algorithm, reconfiguring the circuit for a following algorithm having a greatest probability of requiring execution after the given algorithm.

On the basis of this solution, each algorithm is executed using the circuit which is configured for this algorithm, and, during and/or after execution of one algorithm, a succeeding algorithm is executed, the circuit being reconfigured for this succeeding algorithm during and/or after execution of this one algorithm, at least in so far as this succeeding algorithm is different from this one algorithm, where at least one particular algorithm has at least two associated algorithms, each of which has a respectively different particular probability of being suitable for being executed as succeeding algorithm during and/or after execution of this particular algorithm, and where, of these associated algorithms, the one which is actually executed as the succeeding algorithm is the one which has the greatest probability.

Unlike the known method specified above, in which the order of configuration of the individual sub-algorithms of a larger algorithm is calculated for the compile time, and which is a static method, this method has the advantage that it is possible to infer an algorithm which is to be executed as succeeding algorithm for a particular algorithm earlier, which increases the parallelism between configuration and calculation, and hence the system performance, in particular reduces the execution time.

In this method, the circuit can be configured for a succeeding algorithm after execution of an algorithm, and/or it can be configured for a succeeding algorithm during execution of an algorithm, i.e. can be configured dynamically.

Irrespective of whether a circuit is configured for the succeeding algorithm after or during execution of an algorithm, this method is itself a dynamic method, since the succeeding algorithm is not fixed, but rather is determined on the basis of a probability.

In the second method, the dynamic configuration of the circuit can contribute to further shortening of the execution time, as compared to the first above-outlined method.

In the second method, the fundamental features are the prerequisite that at least one particular algorithm has at least two associated algorithms, each of which has a respectively different particular probability of being suitable for being executed as succeeding algorithm during and/or after execution of this particular algorithm, and that, of these associated algorithms, the one which is actually executed as the succeeding algorithm is the one which has the greatest probability. This means that the probability for each of these associated algorithms does not have to be the same for all of these algorithms, and that, among these algorithms, there is an individual algorithm with a relatively greatest probability.

The different probabilities of the various associated algorithms need to be known as additional information in this method. Without this additional information, with two algorithms which are each associated with a particular algorithm, the probability of being executed as succeeding algorithm during and/or after execution of this particular algorithm is 50% in each case, which means that a reliable decision cannot be made without this information.

To obtain the additional information, the preferable and advantageous procedure is to ascertain for each algorithm which is associated with a particular algorithm and is suitable for being executed as succeeding algorithm during and/or after execution of this particular algorithm how often in the past this one associated algorithm has been executed as a succeeding algorithm during and/or after execution of this particular algorithm as compared with each of the other associated algorithms, where that algorithm among the associated algorithms which has been executed comparatively most often in this past has the greatest probability of being executed as succeeding algorithm during and/or after the current execution of the particular algorithm.

In accordance with another feature of the invention, a restructuring of the circuit during execution of the given algorithm, for execution of the following algorithm to be executed, comprises reconfiguring those parts of the circuit which have been configured for execution of the given algorithm currently being executed.

In accordance with a further feature of the invention, the method comprises:
   determining, for each algorithm that may need to be executed after a given algorithm, how often in the past the respective algorithm has been executed after execution of the given algorithm; and
   reconfiguring the circuit for the algorithm having been executed most frequently in the past after execution of the given algorithm.

In accordance with again an added feature of the invention, each algorithm that may need to be executed after the given algorithm is assigned a number. The number
   has a particular initial value;
   is changed by a particular value if the algorithm having the associated number in question is executed after execution of the given algorithm; and
   is changed by a particular other value if the algorithm having the associated number in question is not executed after execution of the given algorithm.

This method involves extrapolating into the future from decisions in the past. If a particular algorithm has, by way of example, two associated algorithms which are suitable for being executed as succeeding algorithm during and/or after execution of this particular algorithm, and if the one associated algorithm has been selected as succeeding algorithm more frequently in the recent past, then it can be assumed that this associated algorithm has a greater probability of being needed. This means that the incorrect decisions can be reduced by extrapolating into the future. In this context, probability is to be understood as meaning that it is a certainty that an associated algorithm occurs more frequently.

This method can advantageously be carried out such that each algorithm which is associated with a particular algorithm and is suitable for being executed as succeeding algorithm during and/or after execution of this particular algorithm is allocated a respective changing number which assumes an initial value which is the same for all these associated algorithms so long as this associated algorithm has not yet been executed as a succeeding algorithm for this particular algorithm, where the number of an associated algorithm is changed by a particular amount in the direction towards a particular extreme value, which is the same for all these associated algorithms, of this number if this associated algorithm is executed as succeeding algorithm for the particular algorithm, while at the same time the number of each other associated algorithm, which is not executed as succeeding algorithm for the particular algorithm, is changed by a particular amount in the direction away from the extreme value, where the associated algorithm whose number reaches the extreme value first has the greatest probability of being executed as succeeding algorithm during and/or after the current execution of the particular algorithm.

With the above and other objects in view there is also provided, in accordance with the invention, an apparatus for executing individual algorithms, comprising:
   a reconfigurable circuit having sufficient resources for executing each individual algorithm of a plurality of algorithms;
   wherein a plurality of algorithms are executed in the circuit successively in time; and wherein, during an execution of a given algorithm, the circuit is reconfigured for a following algorithm so far as the following algorithm is different from the given algorithm currently being executed.

There is also provided —in the context of the second above-outlined method —an apparatus for executing individual algorithms, comprising:

a reconfigurable circuit having sufficient resources for executing each individual algorithm of a plurality of algorithms;

wherein a plurality of algorithms are executed in the circuit successively in time;

wherein the circuit is reconfigured for a following algorithm during and/or after execution of a given algorithm, at least in so far as the following algorithm to be executed is different from the given algorithm; and wherein, if a variety algorithms may need to be executed after execution of the given algorithm, the circuit is reconfigured for a following algorithm having a greatest probability of requiring execution after the given algorithm.

In accordance with again another feature of the invention, a plurality of counters are provided for selectively counting up or down for changing the number.

In accordance with a concomitant feature of the invention, the counters increase the number only if the number is less than a particular maximum value, and they decrease the number only if the number is greater than a particular minimum value.

In the context of a preferred and advantageous apparatus for carrying out this method, therefore, each algorithm which is associated with a particular algorithm and is suitable for being executed as succeeding algorithm during and/or after execution of this particular algorithm has a respective associated up/down counter where, in each counter, a counter reading which represents the number of the counter's associated algorithm is set to the initial value of this number so long as this associated algorithm has not yet been executed as a succeeding algorithm for the particular algorithm, where the counters are controlled such that the counter reading of a counter is changed by the particular amount in the direction towards the particular extreme value of this counter reading if the associated algorithm of this counter is executed as succeeding algorithm for the particular algorithm, while at the same time the counter reading of each other counter, whose associated algorithm is not executed as succeeding algorithm for the particular algorithm, is changed by the particular amount in the direction away from the extreme value, where the associated algorithm whose counter reaches the extreme value first has the greatest probability of being executed as succeeding algorithm during and/or after the current execution of the particular algorithm.

The invention advantageously permits a time saving for configuration in dynamically reconfigurable systems. For production, similar techniques to those for a branch prediction unit for processors can be applied.

Other features which are considered as characteristic for the invention are set forth in the appended claims.

Although the invention is illustrated and described herein as embodied in a method for executing individual algorithms using a reconfigurable circuit, and apparatus for carrying out such a method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
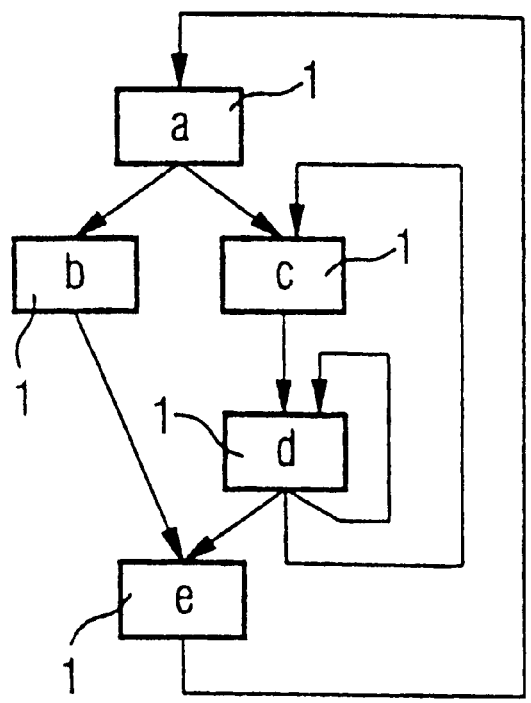
FIG. 1 is a schematic diagram of a reconfigurable circuit which can be configured successively in time for various algorithms which are to be executed, where an algorithm which has an arrow pointing to it from an algorithm can be executed during or after execution of the latter algorithm.

Referring now to the figures of the drawing in detail and first, particularly, to FIG. 1 thereof, there is seen a reconfigurable circuit symbolically using a rectangular box denoted by 1. The circuit 1 can be configured for executing an algorithm and can be reconfigured for executing another algorithm.

To process each such algorithm, the circuit 1 must have sufficient resources. If an algorithm is relatively large, so that the resources of the circuit 1 are not sufficient for executing this algorithm, then the procedure may be for this larger algorithm to be split into smaller subalgorithms such that the resources of the circuit 1 are sufficient for executing each of these subalgorithms, and for these subalgorithms to be processed in succession.

If, by way of example, a subalgorithm has been processed, the configuration for this algorithm can be discarded in the circuit 1, and the configuration for a succeeding subalgorithm can be implemented in the circuit 1. The intermediate results of the calculation can be held in the circuit 1 in the circuit and/or in external memories, in order to continue the calculation in this way. This allows large algorithms to be processed on a relatively small reconfigurable circuit 1, for example in the form of an FPGA (Field-Programmable Gate Array).

It is beneficial for the time of execution of the larger algorithm if, during execution of a subalgorithm, part of the configuration for this subalgorithm which is no longer required is actually reconfigured in the circuit 1 for a subsequent, other subalgorithm, while another part of the configuration for the one subalgorithm is still computing with this algorithm. This parallel implementation achieves a speed advantage.

Usually, the larger algorithm's subalgorithm which succeeds the current calculation of a particular subalgorithm is dependent on the current calculation. This is particularly true in the case where the particular subalgorithm has two associated subalgorithms, each of which is suitable as the succeeding subalgorithm on the basis of the current calculation. This means that the succeeding subalgorithm cannot be determined until late, namely after calculation of the condition for which of the two associated subalgorithms is to be executed as succeeding subalgorithm.

To save time, an example of one procedure may be for one of two or more subalgorithms which are associated with a particular subalgorithm and are each suitable as succeeding subalgorithm to be chosen at random as the succeeding subalgorithm which is to be executed. If this is the correct succeeding subalgorithm, time is saved for configuring the circuit 1 for this algorithm. If it is the incorrect one, then the decision needs to be corrected, i.e. the previous configuration is discarded and a new configuration for the circuit 1 is started. With two possible succeeding subalgorithms, there is a 500 chance of the correct one being configured. The present invention provides an opportunity to increase this probability.

This is explained in more detail with reference to FIG. 1, a configurable circuit which can be configured successively in time for various algorithms which are to be executed, where an algorithm which has an arrow pointing to it from an algorithm can be executed during or after execution of the latter algorithm, which shows a flowchart of a dynamic configuration in which, in one and the same circuit 1, a maximum of five algorithms a, b, c, d and e, for example, for which circuit 1 is to be configured in each case, are executed in succession.

This flowchart lists all the algorithms a to e which arise, and it uses arrows to show which of these algorithms a to e can be executed in direct succession.

The algorithms a to e may, by way of example, be subalgorithms of a larger algorithm which is to be executed.

The circuit 1 configured for an algorithm which is to be executed is shown in FIG. 1 such that the letter denoting this algorithm is entered in the box for this circuit.

Processing of the five algorithms a to e can, in principle, start with any of these algorithms. By way of example, it is assumed that processing starts with the algorithm a.

As FIG. 1 shows, from the circuit 1 configured for this algorithm a, one arrow points to the circuit 1 configured for the algorithm b, and another arrow points to the circuit 1 configured for the algorithm c. This means that the algorithm a is a particular algorithm having two associated algorithms, in this case the algorithms b and c, each of which has a different particular probability of being suitable for being executed as succeeding algorithm during and/or after execution of this algorithm a.

A similar situation applies for the circuit 1 configured for the algorithm d. From this circuit 1, one arrow points to the circuit 1 configured for the algorithm c, another arrow points to the actual circuit 1 configured for the algorithm d, and another arrow points to the circuit 1 configured for the algorithm e. This means that the algorithm d is a particular algorithm having three associated algorithms, in this case the algorithms c, d and e, each of which has a different particular probability of being suitable for being executed as succeeding algorithm during and/or after execution of this algorithm d.

From the circuit 1 configured for the algorithm b, a single arrow points to the circuit 1 configured for the algorithm e. This means that only the algorithm e is executed as succeeding algorithm during and/or after execution of the algorithm b.

The same applies for the algorithms c and e, i.e. only the algorithm d is executed during and/or after execution of the algorithm c, and only the algorithm a is executed as succeeding algorithm during and/or after execution of the algorithm e, since only one arrow points to the algorithm d from the algorithm c, and only one arrow points to the algorithm a from the algorithm e.

For each of the two algorithms b and c jointly associated with the algorithm a, it is ascertained how often in the past this associated algorithm b or c has been executed as a succeeding algorithm during and/or after execution of the algorithm a as compared with the other associated different algorithm c or b. That algorithm among these two associated algorithms b, c which has been executed comparatively most often in this past has the greatest probability of being executed as succeeding algorithm during and/or after the current execution of the particular algorithm a.

Similarly, it is ascertained for each of the three common algorithms c, d, e associated with the algorithm d how often in the past this associated algorithm c or d or e has been executed as a succeeding algorithm during and/or after execution of the algorithm d as compared with each of the other associated algorithms d, e or c, e or c, d. That algorithm among these three associated algorithms c, d and e which has been executed comparatively most often in this past has the greatest probability of being executed as succeeding algorithm during and/or after the current execution of the algorithm d.

Each algorithm b, c or c, d, e which is associated with the particular algorithm a or d and is suitable for being executed as succeeding algorithm during and/or after execution of this particular algorithm a or d is allocated a respective changing number x which assumes an initial value x0 which is the same for all these associated algorithms b, c; c, d, e so long as this associated algorithm b, c; c, d, e has not yet been executed as a succeeding algorithm for this particular algorithm a; d.

The number x of an associated algorithm b or c, or c or d or e is changed by a particular amount Δx in the direction (+) towards a particular extreme value x1, which is the same for all these associated algorithms b, c or c, d, e, of this number x if this associated algorithm b or c, or c or d or e is executed as succeeding algorithm for the particular algorithm a or d, while at the same time the number x of each other associated algorithm b or c, or d, e or c, e or c, d, which is not executed as succeeding algorithm for the particular algorithm a or d, is changed by the particular amount Δx in the direction (−) away from the extreme value x1.

The associated algorithm b or c, or c or d or e whose number x reaches the extreme value x1 first has the greatest probability of being executed as succeeding algorithm during and/or after the current execution of the particular algorithm a or d.

Figure 2:
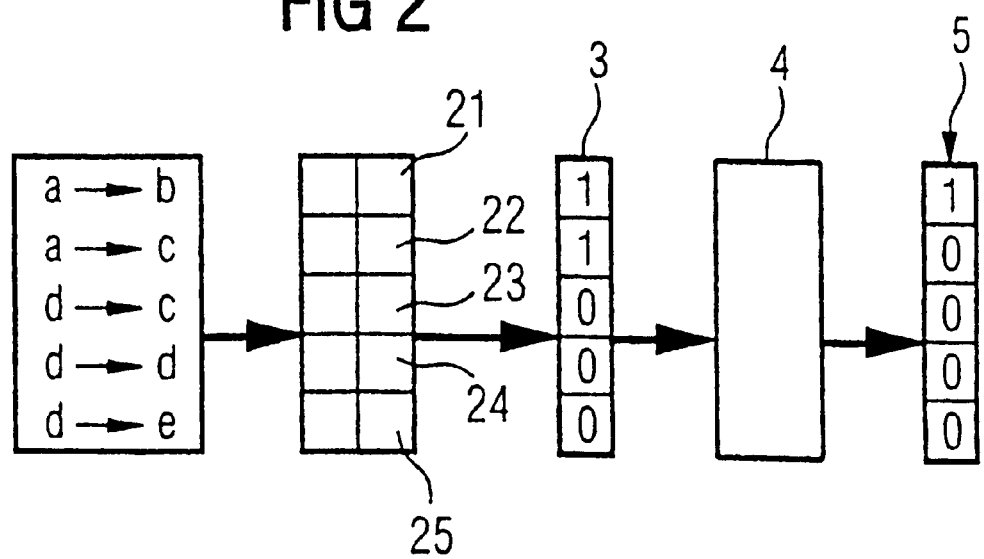
FIG. 2 is a block diagram of an apparatus for ascertaining an algorithm with the greatest probability of being executed as a succeeding algorithm.

Referring now to FIG. 2, there is shown an apparatus for carrying out this method.

In the context of this apparatus, each algorithm which is associated with a particular algorithm and is suitable for being executed as succeeding algorithm during and/or after execution of this particular algorithm has a respective associated up/down counter 21, 22, 23, 24 and 25.

The counter 21 is allocated to the particular algorithm a and to the associated algorithm b, symbolized by a→b, the counter 22 is allocated to the particular algorithm a and to the associated algorithm c, symbolized by a→c, the counter 23 is allocated to the other particular algorithm d and to the associated algorithm c, symbolized by d→c, the counter 24 is allocated to the other particular algorithm d and to the associated identical algorithm d, symbolized by d→d, and the counter 25 is allocated to the other particular algorithm d and to the associated algorithm e, symbolized by d→e.

In each counter 21, 22, 23, 24 or 25, a counter reading which represents the number of the counter's associated algorithm b, c, c, d, e is set to the initial value x0 of this number x so long as this associated algorithm b, c; c, d, e has not yet been executed as a succeeding algorithm for the particular algorithm a or d.

The counters 21 to 25 are controlled such that the counter reading x of a counter 21, 22, 23, 24 or 25 is changed by the particular amount Δx in the direction+ towards the particular extreme value x1 of this counter reading x if the associated algorithm b, c, c, d or e of this counter 21, 22, 23, 24 or 25 is executed as succeeding algorithm for the particular algorithm a or d, while at the same time the counter reading x of each other counter 22 to 25, 21 and 23 to 25, . . . or 21 to 20 24, whose associated algorithm b, c; c, d or e is not executed as succeeding algorithm for the particular algorithm a or d, is changed by the particular amount Δx in the direction− away from the extreme value x1.

The associated algorithm b, c, c, d, e whose counter reaches the extreme value x1 first has the greatest probability of being executed as succeeding algorithm during and/or after the current execution of the particular algorithm a or d.

By way of example, each counter 21, 22, 23, 24 or 25 is a two-bit counter which is set to the initial value x0=00, for example, so long as the associated algorithm b, c, c, d or e has not yet been executed as a succeeding algorithm for the particular algorithm a or d. Besides the initial value x0=00, the number x can assume the values x=01, x=10 and x=11, where x=11=x1 forms the extreme value, which is a maximum value in this case.

Each time that an associated algorithm b or c is selected as succeeding algorithm for the particular algorithm a, for example, the counter reading x in the counter 21 or 22 associated with this algorithm b or c increases by the amount Δx=1, while, at the same time, the counter reading x in the counter 22 or 21 associated with the other, unselected algorithm c or b decreases by the amount Δx=1.

Each time that an associated algorithm c or d or e is selected as succeeding algorithm for the particular algorithm b, the counter reading x in the counter 23 or 24 or 25 associated with this algorithm c or d or e increases by the amount Δx=1, while, at the same time, the counter reading x in the counters 24, 25 or 23, 25 or 23, 24 associated with the other, unselected algorithms d, e or c, e or c, d decreases by the amount Δx=1 in each case.

In this context, increasing the amount Δx means changing the amount Δx in the +direction in each case, and decreasing the amount Δx means changing the amount Δx in the −direction.

If the extreme value x1 has been reached in a counter and if the algorithm associated therewith again is selected as succeeding algorithm, then the extreme value x1 is retained. Similarly, after the initial value x0 has been reached in a counter, this value x0 is retained even if the algorithm associated therewith is once more not selected.

In order to ascertain for a particular algorithm a or d the associated algorithm b or c, or c or d or e which has the greatest probability of actually being executed as the succeeding algorithm for this particular algorithm a or b, it is expedient to use a mask register 3 in which each counter 21 to 25 has a respective associated position, and in which each position associated with a counter 21 and 22 or 23 and 24 and 25 associated with the particular algorithm a or d is in each case set to a value, for example 1, which permits access to the counter readings x of these counters 21 and 22 or 23 and 24 and 25 only. At the same time, all the positions associated with each other particular algorithm d or a are set to another value, for example 0, which blocks access to the counter readings x of the counters 23 and 24 and 25 or 21 and 22 associated with this other particular algorithm d or a.

A maximum value finder 4 searches for the extreme value x1 in all counters 21 and 22 or 23 and 24 and 25 for which the positions of the mask register 3 are occupied by one value, for example 1. For the extreme value x1, or if the counters are level at the extreme values x1, the maximum value finder 4 puts a value into a position of a result register 5 indicating the extreme value x1 which is associated with the relevant counter 21 and/or 22 or 23 and/or 24 and/or 25. For this particular algorithm a or d, the associated algorithm b or c, or c or d or e selected as the succeeding algorithm is that whose position in the result register 5 has the value which indicates the extreme value x1 appearing for the first time. As FIG. 2 shows, the value indicating the extreme value x1 is equal to 1, and, by way of example, the top position of the result register 5 is occupied by this value 1. This means, specifically, that, for the particular algorithm a, the associated algorithm b and not the associated algorithm c is selected as the succeeding algorithm.

In this way, the actually most probable succeeding algorithm can be selected early without the decision actually needing to be calculated in the program cycle. Should the incorrect succeeding algorithm have been selected, then the configuration operation is terminated in the program cycle immediately after calculation of the decision, and the other, correct succeeding algorithm is loaded.

We claim:

1. A method of executing individual algorithms, which comprises:
    providing a reconfigurable circuit with sufficient resources for executing each individual algorithm of a plurality of algorithms, and executing a plurality of algorithms in the circuit successively in time; and
    during execution of a given algorithm, reconfiguring the circuit for a following algorithm having a greatest probability of requiring execution after the given algorithm, so far as the following algorithm is different from the given algorithm currently being executed.

2. The method according to claim 1, wherein a restructuring of the circuit during execution of the given algorithm, for execution of the following algorithm to be executed, comprises reconfiguring those parts of the circuit which have been configured for execution of the given algorithm currently being executed.

3. A method of executing individual algorithms, which comprises:
    providing a reconfigurable circuit with sufficient resources for executing each individual algorithm of a plurality of algorithms, and executing a plurality of algorithms in the circuit successively in time;
    reconfiguring the circuit for a following algorithm during and/or after execution of a given algorithm, at least in so far as the following algorithm to be executed is different from the given algorithm; and
    if a variety algorithms may need to be executed after execution of the given algorithm, reconfiguring the circuit for a following algorithm having a greatest probability of requiring execution after the given algorithm.

4. The method according to claim 3, wherein a restructuring of the circuit during execution of the given algorithm, for execution of the following algorithm to be executed, comprises reconfiguring those parts of the circuit which have been configured for execution of the given algorithm currently being executed.

5. The method according to claim 3, which comprises:
    determining, for each algorithm that may need to be executed after a given algorithm, how often in the past the respective algorithm has been executed after execution of the given algorithm; and reconfiguring the circuit for the algorithm having been executed most frequently in the past after execution of the given algorithm.

6. The method according to claim 5, which comprises:

assigning each algorithm that may need to be executed after the given algorithm a number, wherein the number has a particular initial value;

is changed by a particular value if the algorithm having the associated number in question is executed after execution of the given algorithm; and is changed by a particular other value if the algorithm having the associated number in question is not executed after execution of the given algorithm.

7. An apparatus for executing individual algorithms, comprising:

a reconfigurable circuit having sufficient resources for executing each individual algorithm of a plurality of algorithms;

wherein a plurality of algorithms are executed in said circuit successively in time; and wherein, during an execution of a given algorithm, said circuit is reconfigured for a following algorithm having a greatest probability requiring execution of after the given algorithm so far as of the following algorithm is different from the given algorithm currently being executed.

8. The apparatus according to claim 7, wherein said circuit is restructured during execution of the given algorithm, for execution of the following algorithm to be executed, by a reconfiguration of those parts of said circuit which have been configured for execution of the given algorithm currently being executed.

9. An apparatus for executing individual algorithms, comprising:

a reconfigurable circuit having sufficient resources for executing each individual algorithm of a plurality of algorithms;

wherein a plurality of algorithms are executed in said circuit successively in time;

wherein said circuit is reconfigured for a following algorithm during and/or after execution of a given algorithm, at least in so far as the following algorithm to be executed is different from the given algorithm; and wherein, if a variety algorithms may need to be executed after execution of the given algorithm, said circuit is reconfigured for a following algorithm having a greatest probability of requiring execution after the given algorithm.

10. The apparatus according to claim 9, wherein said circuit is restructured during execution of the given algorithm, for execution of the following algorithm to be executed, by a reconfiguration of those parts of said circuit which have been configured for execution of the given algorithm currently being executed.

11. The apparatus according to claim 9, wherein:

for each algorithm that may need to be executed after a given algorithm, a determination is made how often in the past the respective algorithm has been executed after execution of the given algorithm; and said circuit is reconfigured for the algorithm having been executed most frequently in the past after execution of the given algorithm.

12. The apparatus according to claim 11, wherein each algorithm that may need to be executed after the given algorithm is assigned a number, and the number has a particular initial value;

is changed by a particular value if the algorithm having the associated number in question is executed after execution of the given algorithm; and is changed by a particular other value if the algorithm having the associated number in question is not executed after execution of the given algorithm.

13. The apparatus according to claim 12, which comprises a plurality of counters selectively counting up and down for changing the number.

14. The apparatus according to claim 13, wherein said counters increase the number only if the number is less than a particular maximum value.

15. The apparatus according to claim 13, wherein said counters decrease the number only if the number is greater than a particular minimum value.

* * * * *